United States Patent [19]

Kervagoret

[11] 3,948,050
[45] Apr. 6, 1976

[54] POWER STEERING MECHANISM

[75] Inventor: Gilbert Kervagoret, Argenteuil, France

[73] Assignee: Societe Anonyme D.B.A., Paris, France

[22] Filed: Oct. 7, 1974

[21] Appl. No.: 512,599

[30] Foreign Application Priority Data
Oct. 9, 1973  France .............................. 73.35929

[52] U.S. Cl. .................. 60/477; 91/434; 180/79.2 R
[51] Int. Cl.² ........................................ F15B 13/14
[58] Field of Search .............. 91/370, 371, 372, 373, 91/434; 60/388, 477; 180/79.2 D, 79.2 R

[56] References Cited
UNITED STATES PATENTS

| | | | |
|---|---|---|---|
| 2,063,937 | 12/1936 | Kundig .................................. | 91/434 |
| 2,695,035 | 11/1954 | Brown .................................. | 91/434 X |
| 2,757,748 | 8/1956 | MacDuff .............................. | 91/372 X |
| 2,930,357 | 3/1960 | Brueder .............................. | 91/372 |
| 3,426,612 | 2/1969 | Henry-Biabaud .......... | 180/79.2 D X |
| 3,791,475 | 2/1974 | Cadiou ............................. | 180/79.2 R |
| 3,828,883 | 8/1974 | Rist .................................. | 180/79.2 R |

FOREIGN PATENTS OR APPLICATIONS

| | | | |
|---|---|---|---|
| 1,041,817 | 10/1958 | Germany ....................... | 180/79.2 R |

*Primary Examiner*—William L. Freeh
*Assistant Examiner*—Edward Look
*Attorney, Agent, or Firm*—Ken C. Decker; William N. Antonis

[57] ABSTRACT

The invention discloses a power-steering mechanism for an automotive vehicle, having a double acting actuator with two pressure chambers separated by an actuator piston. The actuator is connected both to the chassis of the vehicle and to a linkage associated with the direction controlling wheels of the vehicle. The pressure in the actuator chambers are controlled by a distributing valve operated by the steering wheel moved in either direction from a central, idle position. A reaction device adapted to create a return force biasing the steering wheel into its central position includes a circular cam eccentrically mounted on the rotating shaft of steering wheel and subjected to a thrust transmitted by a tappet. The tappet is projecting into a closed compartment to engage a reaction piston submitted to the pressure prevailing in a fluid accumulator. Two plungers are slidably mounted in the compartment and are submitted to the pressure prevailing in the actuator chambers. Finally stops are provided to limit motions of the plungers out of the closed compartment.

10 Claims, 7 Drawing Figures

POWER STEERING MECHANISM

The invention relates to power-assisted steering for a motor vehicle. When power-assisted steering for motor vehicles first appeared, designers recognized the necessity to provide a reaction device for the steering control member, i.e. the steering wheel of the vehicle, in order to prevent movements not intended by the vehicle's driver.

A type of assisted steering was therefore proposed which comprised a double-acting actuator with two pressure chambers separated by an actuator piston, the actuator being adapted to be connected both to the chassis of the vehicle, and to a linkage associated with the direction-controlling wheels of the vehicle, a pressure fluid distributing valve adapted to be connected to a pressure source, to a low pressure reservoir and to the actuator and permitting control of the pressure in at least one of the two chambers in accordance with the motions of a control member moved by an operator in either direction from a central, idle position, and a reaction device comprising resilient means capable of creating a return force urging the control member into its central position.

Steering of this type has not been satisfactory, however, since the effort required in order to move the direction-controlling wheels of the vehicle depends essentially both on the adhesion between the tires and the ground below them and on the speed of the vehicle. In particular, the effort required to move the steering wheel is of course very much reduced when the vehicle is moving briskly. It has been proposed that the calibration of the resilient means should vary with the speed of the vehicle, in particular as in an arrangement described in French Pat. specification No. 1 598 825. In this case the calibration of the resilient means was varied by the motion of a member responsive to a control pressure produced by a pump, which in turn was driven by the transmission shaft of the vehicle's engine.

This arrangement has two disadvantages. First, it never allows for the conditions of adhesion between the tires and the ground over which the vehicle is moving. Secondly, it creates a completely arbitrary relationship between the vehicle speed, or rather the speed of the drive shaft, and the calibration of the resilient means of the reaction device for the power steering. This relationship is fixed in advance and cannot accurately and continuously follow the variations in the effort required of the steering to move the vehicle wheels as a function of the vehicle speed, irrespective of the adhesion between tires and ground. As a result, parking manoeuvres are often hard for the driver, on account of the marked increase in adhesion during pivoting of the direction-controlling wheels. Furthermore, known reaction devices for power steering can never respond to a sudden important change in the adhesion between the tires and ground.

An object of the invention is therefore to provide power-assisted steering mechanism of the type defined above, wherein the reaction device comprises a reaction piston movable in a closed compartment, means for generating in said compartment a control pressure variable as a function of the pressure imbalance force acting on the actuator piston and produced by the pressures prevailing in the two chambers, and the reaction piston which is responsive to the control pressure acts on the resilient means so as to reduce the return force as the imbalance force increases.

In view of the fact that the imbalance force acting on the actuator piston is proportional to the effort required to move the direction-controlling wheels, it is clear from the structure defined above that the variation in the reaction force responds very sensitively to the variations in the effort required of the power steering mechanism to move the vehicle wheels what ever is the speed or of the tires ground adhesion. If for any reason the effort required of the power steering is very great, for example during parking, the return force created by a reaction device embodying the invention will diminish very substantially. Conversely, any abrupt reduction in adhesion will cause hardening of the power steering. Thus, the reaction device of the steering, designed to transmit artificial sensation to the driver is able to adapt this sensation to the conditions under which the vehicle is operating.

The invention will now be described with reference to the accompanying drawings, in which.

Figure 5:
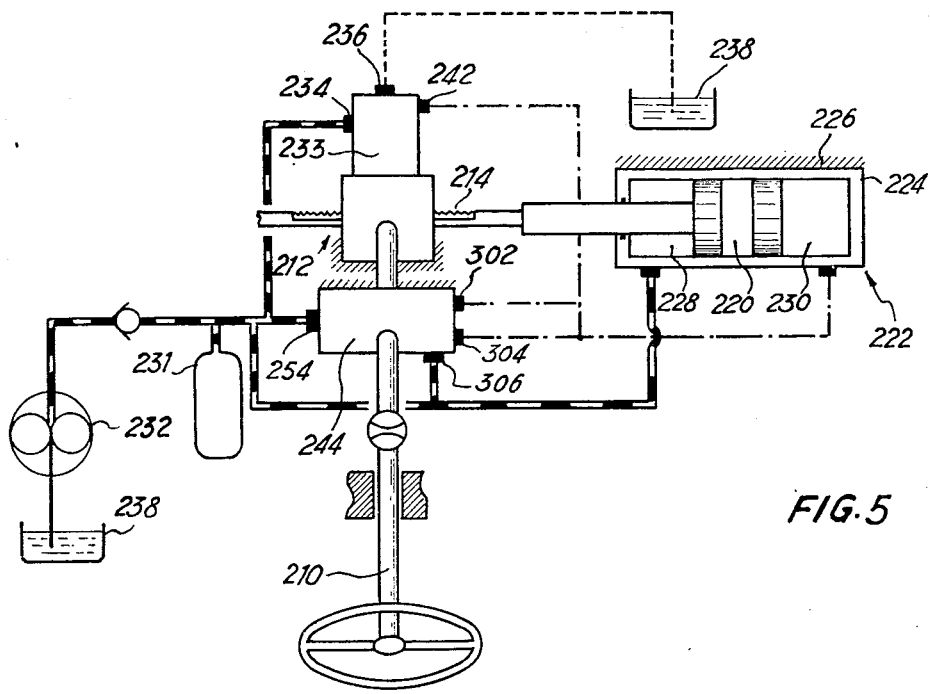
FIG. 5 shows diagrammatically part of power-assisted steering comprising a three-way distributing valve and asymmetrical actuator.
Figure 7:
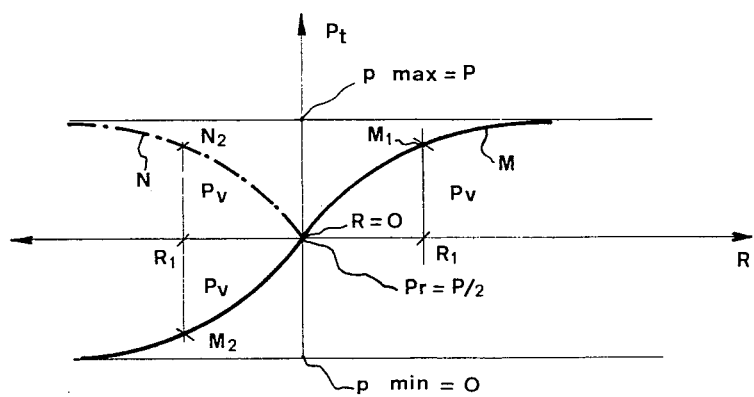
Figure 6:
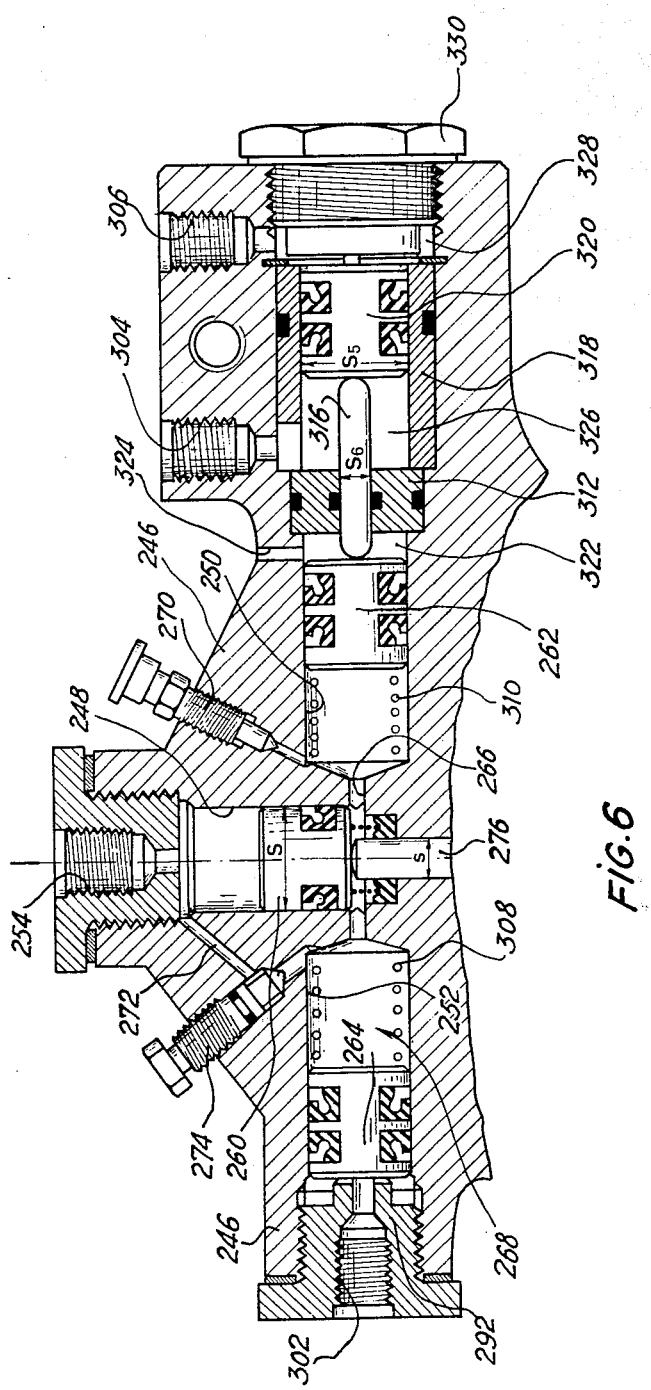

FIG. 6 diagrammatically represents part of a reaction device for the power steering shown in FIG. 5; and FIG. 7 is a diagram representing the control pressure prevailing in the closed compartment in the reaction device shown in FIG. 6, as a function of the angle of rotation R of the steering column of the vehicle.

Figure 1:
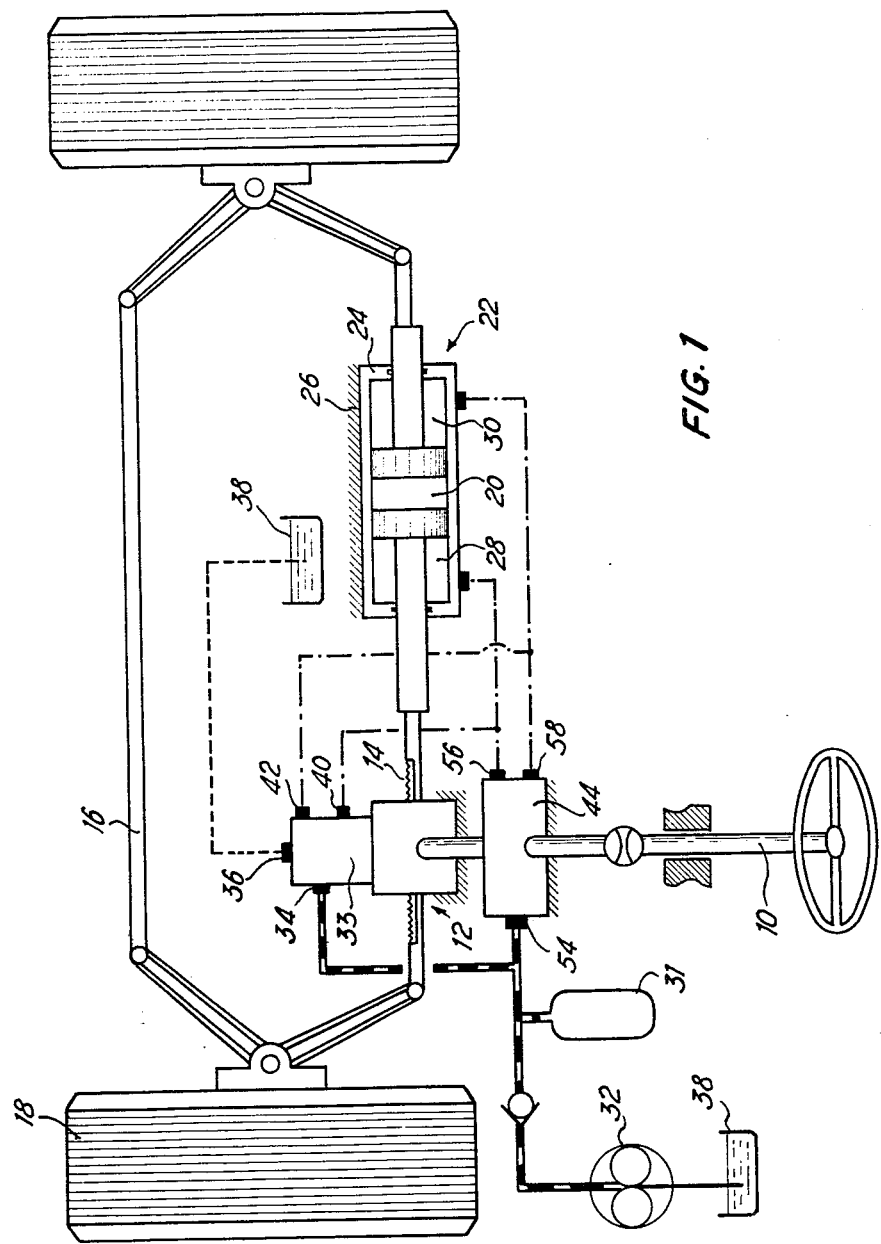
FIG. 1 is a diagrammatic view of power-assisted steering for a motor vehicle, comprising a four-way distributing valve and a symmetrical actuator.

The power-assisted steering shown in FIG. 1 comprises a steering column 10 which drives a power steering valve mechanism 12 of the rack and pinion type. The rack 14 is connected both to a linkage 16, capable of moving the direction-controlling wheels 18 of the vehicle, and to the piston 20 of a double-acting actuator 22. The actuator 22 is of the symmetrical type, that is, the opposite ends of the piston 20 have substantially the same effective cross-sections.

The housing 24 of the actuator is mounted on the vehicle chassis 26 and contains two opposite pressure chambers 28, 30. The mechanism 12 comprises a valve 33 of any known type, for example a closed-centre four-way rotary type. An accumulator 31 charged by a pump 32 delivers pressure fluid to the inlet orifice 34 of the valve 33.

The valve 33 also has two orifices 40, 42 connected to the chambers 28, 30 respectively and a discharge orifice 36 connected to a reservoir (represented diagrammatically in two parts in FIG. 1). When the valve 33 occupies its idle position, corresponding to the central, idle position of the control member, equal pressures are maintained in the opposite chambers 28 and 30. However, when the steering column is rotated out of its central, idle position, the valve can create a pressure difference between the two actuator chambers by using pressure fluid from the accumulator, so as to generate an imbalance force exerted on the actuator piston 20 to aid motion of the rack 14. Power steering mechanisms are well known in the art, and therefore the valve 33 and mechanism 12 will not be described in more detail.

Figure 2:
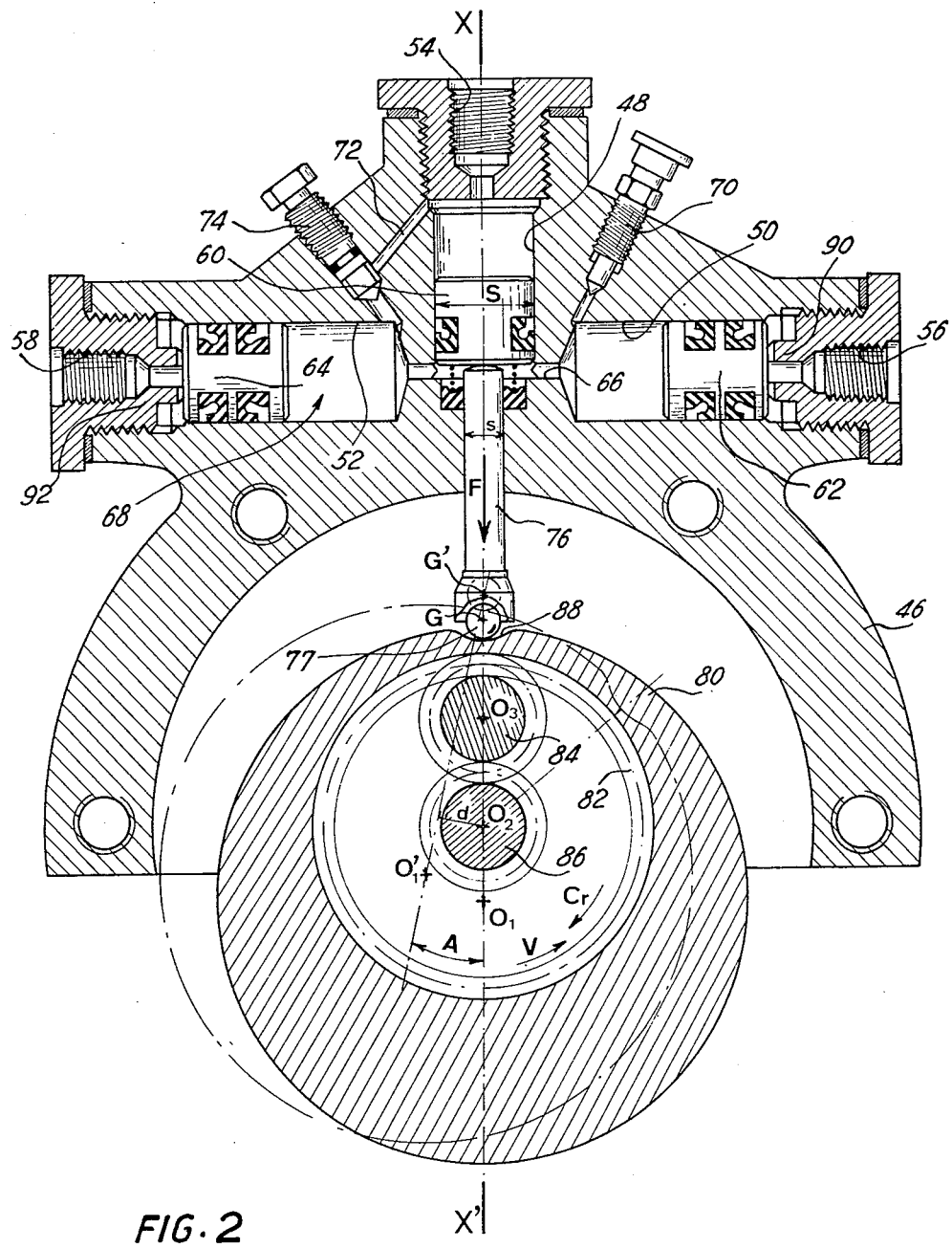
FIG. 2 represents a cross-section for a reaction device embodying the invention in the power steering shown in FIG. 1.

In accordance with the invention the accumulator 31 and the two chambers 28, 30 are also connected to a reaction device 44, which will be described in more detail with reference to FIG. 2. The reaction device 44 comprises a casing 46 containing three bores 48, 50 and 52. These bores communicate by way of respective orifices 54, 56, 58 with the accumulator 31 and with the chambers 28, 30 of the double-acting actuator. A reaction piston 60 and two plungers 62, 64 are mounted respectively in the three bores 48, 50 and 52. The ends of the three bores communicate by way of a passage 66, so that with the plungers and the reaction piston they define a closed compartment 68, which is filled with incompressible fluid. To this end there are provided a bleeding screw 70 and a filler duct 72 controlled by a screw 74. A tappet 76 coaxial with the piston 60 projects into the bore 48 and has an effective cross-section much smaller than of the piston 60. At the free end of the tappet 76, there is a ball 77, capable of co-operating with the periphery of a cam 80. The cam has an internal toothed ring 82 meshing with an intermediate gear 84, which in turn meshes with a shaft 86 pivotably mounted on the casing and driven by the steering column 10. In FIG. 2 the various components of the reaction device are in their idle positions, which correspond to a stable idle central position of the vehicle steering column. To this end the periphery of the cam 80 includes a flat portion 88, to make the steering while in its idle position. It will be noted that in this position the three centers 01, 02 and 03 of the cam 80, shaft 86, a pinion 84 are aligned on the axis $XX'$ of the bore 48, which is also the axis of symmetry of the cam 80.

In this embodiment the resilient return means for the reaction device, takes the form of the reaction piston 60 exposed to the pressure in the accumulator 31. For this purpose, the closed compartment 68 is filled as follows. After removal of the screws 74 and 70, incompressible pressurized fluid is introduced by way of the duct 72 so that the two plungers 62, 64 are urged into the limit positions illustrated, in which they bear on plugs 90, 92 inserted in the casing 46. The screw 74 is then inserted. As a result of the high pressure in the bore 48 the piston 60 is then urged on to the tappet 76 as shown in the drawing, whereupon the bleeding screw 70 is replaced. Thus, as it will be explained during the description of the way of operation of the power-steering, the plungers arrangement permits to generate in the closed compartment a control pressure variable as a function of the levels of pressure in the ports 56 and 58.

Without exceeding the scope of the invention, return springs may be added to urge the piston 60 downwards in FIG. 2. In some cases these springs completely replace the resilient chamber formed by the accullator. However, the variant of the invention with an accumulator has the advantage of making the device more compact. It is sometimes an advantage to have weak return springs acting on the plungers 62, 64.

The reaction device just described operates as follows. Let us firstly assume, to facilitate the ensuing explanation, that the two plungers 62, 64 are not subjected to the respective pressures in the actuator chambers, i.e. that there is no pressure in the control chamber 68 and that the driver of the vehicle moves the steering wheel in a direction such that the pinion 86 rotates as indicated by an arrow V. The centre 01 of the cam 80 pivots about 02 into a position 0'1. At the same time the centre of the ball 77 moves from a point G to a point G'. The piston 60 moves upwards in FIG. 2, due to the resilience of the pressure chamber represented by the bore 48 and the accumulator 31. To illustrate these movements, chainlines indicate the new positions of the periphery of the cam 80 and of the ball 77. The point of contact between the roller and the cam 80 is now on a straight line $G'0'1$ which forms an angle A with the axis $XX'$. Assuming a reaction force F transmitted by the tappet 76, its component along the straight line $G'0'1$ is equal to $F \cos A$. Moreover, the shortest distance between the point 02 and the straight line $G'0'1$ is equal to $d$, so that the torque of reaction to the shaft 86 is equal to $Cr = F \cos A \times d \times K$, K being the mechanical transmission factor between the torque acting directly on the cam 80 and the torque acting on the shaft 86, this latter torque being in effect felt by the driver of the vehicle. If S is the effective cross-section of the reaction piston 60, the force F is equal to the product of this effective cross-section and the pressure P prevailing in the chamber of the accumulator 31. The reaction torque Cr acts in the direction indicated by an arrow Cr, which is opposite to the arrow V. Since the deflection of the cam 80 and its profile are chosen such that the product $d \times \cos A$ remains an increasing function of the angle $A$, the return torque increases, the further the steering wheel is moved out of its central position.

Let us assume now that, in accordance with the invention, the two plungers 62, 64 are subjected respectively to the pressures prevailing in the chambers 28, 30 of the double-acting actuator. Motion of the piston 60 upwards in FIG. 2, when the tappet 76 is pushed upwards by the rotating cam, will allow one of the plungers 62, 64 to move off its stop. Let us say, by way of example, that the plunger 62 is subjected to the greater of the pressures in the two chambers 28, 30. The control pressure Pc prevailing in the closed compartment 68 is therefore substantially equal to the pressure prevailing in the actuating chamber of the actuator. The latter pressure will be termed the working pressure Pt. If s is the effective cross-section of the tappet 76, the force is given by the expression $F = P \times S - Pc (S - s)$. Since $Pc = Pt$ due to the equilibrium of plunger 62 in bore 50, it is clear that if the pressure P in the accumulator remains substantially constant the reaction force F transmitted by the plunger 62 is an inverse linear function of the working pressure Pt.

It must be emphasized that in some known forms of hydraulic power steering for motor vehicles, the value of the working pressure Pt stabilizes at a given level substantially proportional to the steering effort to be transmitted by the rack 14. In particular, it is well known that during parking manoeuvre the effort is particularly large and requires a working pressure much greater than the working pressure needed when moving at high speed. The pressure difference between the two chambers of the actuator is substantially proportional to the effort required at the rack. Where the power steering valve is of the closed-centre type, the pressure difference is substantially equal to the working pressure according to a hypothesis in which the non-actuating chamber is connected to the low pressure reservoir. Other known closed-center valves, however, enable a residual pressure $Pr$ to be maintained in the two chambers when idle. The latter valves are such that the working pressure is equal to the residual pressure plus half the pressure difference across the actuator piston 20. In both cases, therefore, the control pressure generated in the compartment 68 is variable as a function of the pressure imbalance force acting in the actuator piston and then the return force $F$ is a linear and inverse function of the effort required at the rack. Consequently, for every variation in the steering effort there is a corresponding variation in the working pressure $Pt$ in the actuating chamber of the actuator and, as a result, a variation in the reaction torque at the steering wheel. As already indicated at the beginning of this description, this feature is of great importance, because it enables the reaction at the steering wheel to be adapted to all adhesion and vehicle speed conditions. During parking manoeuvre, in particular, the effort at the rack is very great, and this results in an increase in the admission pressure Pt and an appreciable reduction in the reaction torque Cr. Conversely, for equal tire adhesion condition, an increase in the vehicle speed substantially reduces the effort at the rack, leading to reduction of the working pressure and therefore hardening of the steering. Moreover, if, for example, the adhesion of one wheel should suddenly diminish, the hardening of the steering would consequently increase.

It should be noted also that the establishment of equilibrium of the working pressure $Pt$ takes some time. For this reason the return force $F$ is greater during this transitional period in the establishment of the working pressure than when it has reached its final level. The return torque acting on the steering wheel when the latter is turned suddenly will therefore be momentarily greater than the return torque acting on the steering wheel when the latter is moved slowly and smoothly. This feature is advantageous from the point of view of safe driving. Without exceeding the scope of the invention, a number of variants and modifications may be made to the device described above:

Firstly, the rotary closed-center valve is replaced with a sliding open or closed-center valve or with a rotary open-center valve of any known type (for example, the rotary open-center fourway valve described in French Pat. specification No. 1 598 825). In the case of an open-center assisted steering valve, the working pressure defined above remains substantially equal to the pressure difference in the actuator. As regards the resilient means, they are formed either by the resilient chamber of an accumulator for power brakes, if available on the vehicle, or by return springs. Since in power steering of the open-center type the maximum pressure in the chambers does not exceed 50 kg/cm², as opposed to 150 kg/cm² in the case of closed-center power steering, the space occupied by return springs for the reaction piston 60 remains small.

Secondly, the invention may be used with a double-acting actuator of the asymmetrical type, in which the rack is driven by a stepped differential piston. To give a steering column reaction which is symmetrical on both sides of the idle position, one of the following adaptations is used:

a. a modified or asymmetrical cam profile; and
b. the use of plungers mounted in a asymmetrical way . . . for example, one of the two plungers may be stepped to obtain a pressure ratio change.

Figure 3:
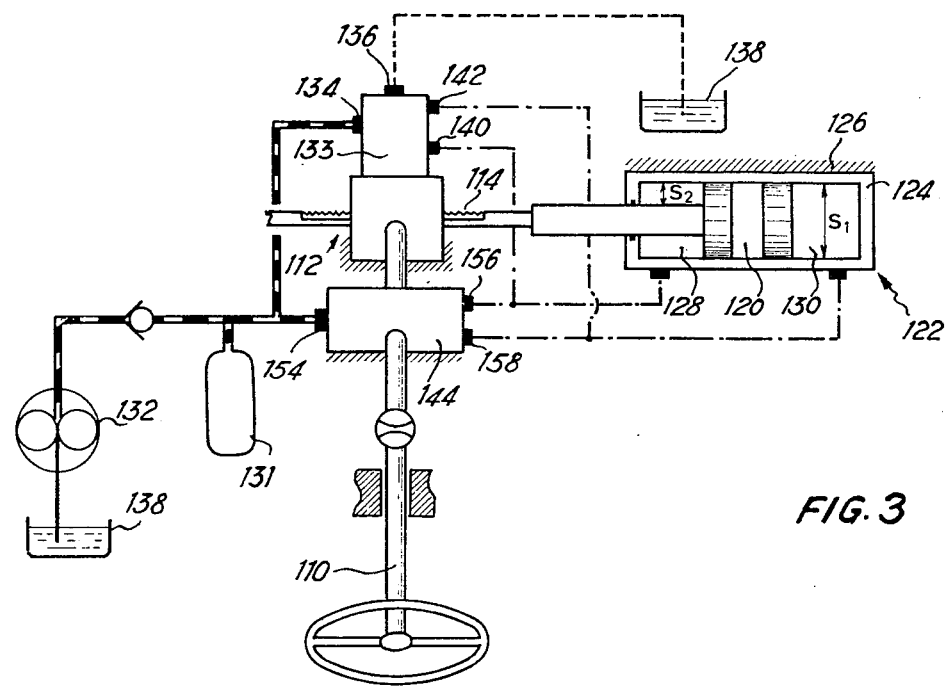
FIG. 3 shows diagrammatically part of power-assisted steering comprising a four-way distributing valve and an asymmetrical actuator.
Figure 4:
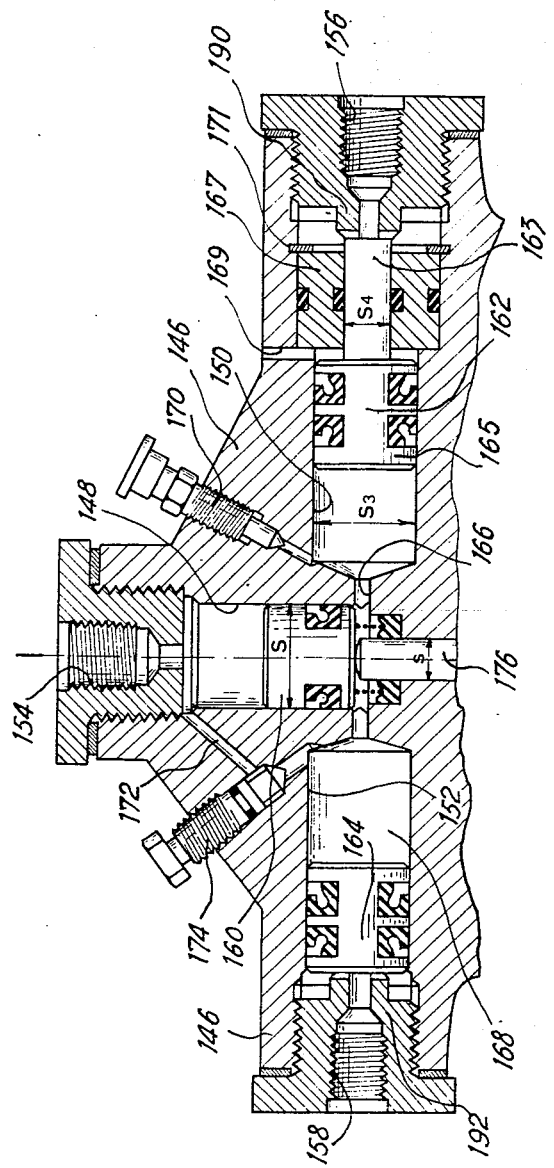
FIG. 4 represents diagrammatically part of a reaction device for the power steering shown in FIG. 3.

FIGS. 3 and 4 illustrate an embodiment of the invention having the latter modification. Components identical or similar to those previously described and illustrated in FIGS. 1 and 2 bear the same reference numerals as their equivalents plus 100. The actuator 122 has a chamber 130 adjacent to that face of the piston 120 having the larger effective cross-section S1 and a chamber 128 adjacent to that piston face having the smaller effective cross-section S2. The actuator is supplied by a four-way distributing valve, which may be of the open or closed-center type. The plunger 162 is stepped, with an outer portion 163 of smaller effective cross-section S4, which projects into the orifice 156 through a sleeve 167 mounted in the casing 146 and held by a circlip 171. The inner face of the plunger 162 has the larger effective area S3, and the ratio $B = S3/S4$ selected is equal to the ratio $S1/S2$. Lastly, a hole 169 is provided in the casing to permit motion of the plunger 162. For a given effort at the rack 114 there prevails, according to the direction of this effort, either a pressure Pt in the chamber 130, or a pressure $B \times Pt$ in the chamber 128, assuming that the non-actuating chamber is substantially at the pressure of the reservoir. Because the chamber 128 is connected to the orifice 156 in such a way that the corresponding faces of the piston and of the stepped plunger 162 co-operate, whatever the direction in which the steering column turns, the control pressure in the closed compartment is equal to $Pt$ and the reaction is symmetrical, once the pressure have been established in the chambers of the actuator.

Finally, other power steering mechanisms exist with asymmetrical actuators and are controlled by three-way closed-center distributing valves. FIGS. 5 and 6 illustrate an embodiment of the invention relating to this type of steering. Here, also, components identical or similar to those previously described and shown in FIGS. 1 and 2 bear the same reference numerals as their equivalents, plus 200.

As FIG. 5 shows, the actuator 222 is asymmetrical. The chamber 228 adjacent to the piston face having the smaller effective cross-section is connected directly to the accumulator 231. The other chamber 230, which adjoins the face having the larger effective cross-section, is connected to the three-way distributing valve 233 disposed between the accumulator 231 and the reservoir 238. The maximum pressure $P$ max obtained in the chamber 230 is therefore the constant pressure $P$ prevailing in the accumulator, whereas the minimum pressure $P$ min is the pressure prevailing in the reservoir. When the power steering is idle, on the other hand, the piston 220 is substantially balanced and there is therefore a residual pressure Pr in the chamber 230. Designers generally select the effective areas of the piston 220 so that the residual pressure Pr is substantially half the maximum pressure, that is, $P/2$ (the ratio between the effective cross-sections of the actuator piston is made equal to 2). Consequently, depending on the direction of rotation R of the steering column, the pressure in the chamber 230 varies in accordance with a curve M shown in FIG. 7. If $Pv$ is the absolute pressure variation in the chamber 230, this variation is proportional to the effort transmitted to the rack 14, which is equal to the product of $Pv$ and the effective cross-section of that face of the piston 220 adjacent to the chamber 230. Depending on the direction of rotation R, the representative point will be $M1$ if the working pressure in the chamber 230 equals $P/2 + Pv$, or $M2$ if the working pressure is equal to $P/2 - Pv$.

In a particular embodiment of the invention, the reaction device is designed to generate in the closed compartment a control pressure always equal to $P/2 + Pv$, irrespective of the direction of rotation of the steering column. If $N$ is the curve representing the control pressure, $N$ coincides with $M$ when the direction of rotation from the idle position of the steering wheel corresponds to an increase in the working pressure, and $N$ and the curve $M$ are symmetrical relative to a straight line parallel to the axis of abscissae and representing the value $Pr = P/2$ in the opposite case. The result permits a steering column reaction to be obtained which is symmetrical on either side of the central, idle position.

To this end the device shown in FIG. 1 is modified, especially into respect to the elements permitting to generate the control pressure to take the form partially illustrated in FIG. 6. The bore 250 in which the plunger 262 slides is stepped to receive a ring 312, through which slides a rod 316 of effective cross-section S6, and a sleeve 318, which slidably receives a piston 320 of the same effective cross-section S5 as the plunger 262. The ring 312 forms a fluid-tight partition between a cavity 322, which is adjacent to the piston 262 and is connected to the atmosphere by a hole 324, and another cavity 326 connected by an orifice 304 to the variable pressure chamber 230 of the actuator. Also, the piston 320 separates the cavity 326 from a third cavity 328 connected by an orifice 306 to the constant pressure chamber 228 of the actuator. A plug 330 acts as a stop for the piston 320 and thereby for the rod 316 and plunger 262 and holds the ring 312 and the sleeve in place in the bore 250. The sleeve 318 is slotted so that fluid can pass freely from the orifices 304, 306 to the cavities 326, 328. Two springs 308, 310 urge the plungers towards their idle positions, as shown in FIG. 6. Lastly, the plug 292 contains an orifice 302 which is connected to the variable pressure chamber.

The device just described operates as follows.

Assuming that the power steering is idle, the pressure prevailing at the orifices 302, 304 is equal to $P/2$, whereas the pressure at the orifices 254, 306 is equal to $P$. As a result, when the closed compartment 268 is filled and the screw 274 is off, the movable assembly formed by the plunger 262, rod 316 and piston 320 is urged to the right in FIG. 6 by a force equal to $P/2 \times (S5 - S6) + T$, in which $T$ is the returning force of the spring 310. (Note that filling of the closed compartment 268, the screw 274 being off, is equivalent to a control pressure equal to $P$). When the screw 274 is replaced and the compartment 268 is drained, the piston 260 takes up its idle position as in the drawing, and the pressure inside the compartment becomes substantially equal to the residual pressure $Pr = P/2$ prevailing in the actuator chamber 230, if one ignores the calibration of the spring 308, which is weak compared with the pressures acting on the plungers 262, 264. In particular, the force urging the movable assembly towards the right of FIG. 6 into its idle position is given by the term $T - P/2 \times S6$. The spring 310 is made just strong enough to balance the pressure acting on the rod 316.

Let us assume that the steering column is moved so that a working pressure $Pt$ equal to $P/2 + Pv$ is generated in the chamber 230. The piston 264 will move off the plug 292 and generate a control pressure equal to $P/2 + Pv$ in the closed compatment 268, while the movable assembly remains stationary. This is because the force urging the movable assembly to the right in the figure is equal:

$$2 Pt \times S5 - P \times S5 - Pt \times S6 + T,$$

that is to say, $$T - P/2 \times S6 + Pv (2 S5 - S6),$$

and this force remains positive and increases with the value of $Pv$.

Assuming now that the steering column is moved so as to generate a working pressure to $P/2 - Pv$, the movable assembly moves to the left in FIG. 6, whereas the piston 264 remains stationary. The equilibrium equation for the movable assembly is:

$$T + Pc \times S5 + (P/2 - Pv) S5 = (P/2 - Pv) S6 + S5,$$

that is to say, $$Pc = P/2 + Pv - Pv \times S6/S5 - (T - P/2 \times S6) S5.$$

The term $T - P/2 \times S6$ is made as small as possible by suitable calibrating the spring 310. The term $Pv \times S6/S5$ is made as small as possible also, by using a rod of minimum cross-section; in particular, a ratio $S5/S6$ of the order of 10 is selected. Consequently the control pressure at equilibrium is less than, but very close to the value $P/2 + Pv$. This ensures that the plunger 264 remains in its idle position. It is clear from the above that for a variation $Pv$ in the pressure in the actuator chamber 230, there is a substantially equal increase in the control pressure in the closed colpartment 268.

Because of this structural modification the variation in the control pressure is rendered proportional to the variation in the effort required to drive the direction-controlling wheels, and the reaction device thus modified operates similarly to that described with reference to FIG. 2 and offers the same advantages.

I claim:

1. A power assisted steering system including a fluid pressure source and a low pressure reservoir, power steering apparatus comprising a double-acting actuator having a housing, an actuator piston slidable in said housing and having a pair of opposed faces cooperating with opposite ends of the housing to define a pair of opposed fluid pressure receiving chambers, a fluid pressure distributing valve for controlling communication between said source, said chambers and said reservoir, a control member for operating said distributing valve to communicate high pressure fluid to a corresponding one of said chambers depending upon the direction of movement of said control member from a central idle position, and a reaction device comprising a housing defining a closed compartment therewithin, a reaction piston slidably mounted in said compartment, means for providing a predetermined force to one side of said reaction piston, connecting means connecting said reaction piston to said control member whereby the force exerted by said reaction piston on said control member yieldably urges said control member to said idle position with a force proportional to a net force acting on the reaction piston, means for generating a control pressure acting on said reaction piston in opposition to said predetermined force, said generating means being connected to said actuator piston chambers, and said control pressure being a function of the pressure differential in said chambers across said actuator piston.

2. A power assisted steering system according to claim 1, wherein said means for providing a predetermined force includes a constant pressure fluid.

3. A power-assisted steering as claimed in claim 1, wherein the connecting means comprises a cam driven by the control member by way of a rotating shaft and subjected to thrust transmitted by a tappet movable along a translation axis substantially perpendicular to the rotational axis of the shaft, the tappet being mounted coaxially relative to the reaction piston and projecting into the closed compartment so as to abut on the reaction piston, the effective cross-section of the reaction piston being greater than that of the tappet.

4. A power-assisted steering as claimed in claim 3, wherein the cam has a circular profile and is mounted eccentrically on the rotating shaft.

5. A power-assisted steering as claimed in claim 3, wherein the periphery of the cam comprises a flat portion on each side of the axis of translation of the tappet, so as to create a zone of stability in the power-assisted steering on each side of the central, idle position.

6. A power-assisted steering as claimed in claim 1, in which the distributing valve is of the four-way symmetrical type and connected to the pressure source, to the reservoir and to both chambers in the actuator, said closed compartment being filled with incompressible fluid, said means for generating the control pressure including two plungers having inner ends projecting into said compartment and outer ends subjected to the pressures prevailing in the chambers of the actuator, and stops provided to limit motions of the plungers out of the closed compartment.

7. A power-assisted steering as claimed in claim 6, in which the actuator is of the asymmetrical type comprising a stepped piston, wherein one of the plungers is of the stepped type, the ratios between the effective cross-sections of the actuator piston and of the stepped plunger being equal, and communications between the actuator chambers and the reaction device being such that the faces of smaller and greater section of the stepped piston co-operate with the faces of smaller and greater section of the stepped plunger respectively.

8. A power-assisted steering as claimed in claim 1, wherein the double-acting actuator is of the asymmetrical type comprising a first chamber adjacent to that piston face having the smaller effective cross-section and a second chamber adjacent to that piston face having the larger effective cross-section, the distributing valve being of the closed-centre three-way type and connected to a pressure accumulator, to the reservoir and to the second chamber, the first chamber being connected directly to the accumulator. further comprising a casing housing the closed compartment which is filled with incompressible fluid, said means for generating the control pressure including two plungers having inner ends projecting into said compartment the outer end of one of the two plungers projecting into a first cavity connected to the second chamber, the outer end of the other plunger projecting into a second, low pressure cavity, the second cavity being separated from a third cavity connected to the second chamber by a fixed wall in the casing, the third cavity being separated by an auxiliary piston separated from a fourth cavity connected to the first chamber and a rod traversing the wall being engaged between the other plunger and the auxiliary piston, and stops being provided to limit motions of the plungers out of the closed compartment.

9. A power-assisted steering as claimed in claim 8, wherein the effective cross-section of the other plunger and of the auxiliary piston are equal.

10. A power-assisted steering as claimed in claim 8, wherein the effective cross-section of the rod is about 1/10 of that of the auxiliary piston.

* * * * *